US009720562B2

(12) United States Patent
Chang et al.

(10) Patent No.: US 9,720,562 B2
(45) Date of Patent: Aug. 1, 2017

(54) METHOD OF PROVIDING VIRTUAL REALITY BASED THREE-DIMENSIONAL INTERFACE FOR WEB OBJECT SEARCHES AND REAL-TIME METADATA REPRESENTATIONS AND WEB SEARCH SYSTEM USING THE THREE-DIMENSIONAL INTERFACE

(71) Applicant: KOREA ADVANCED INSTITUTE OF SCIENCE AND TECHNOLOGY, Daejeon (KR)

(72) Inventors: Seongju Chang, Daejeon (KR); Apurva Gupta, Guwahati (IN)

(73) Assignee: Korea Advanced Institute of Science and Technology, Daejeon (KR)

( * ) Notice: Subject to any disclaimer, the term of this patent is extended or adjusted under 35 U.S.C. 154(b) by 379 days.

(21) Appl. No.: 14/327,107

(22) Filed: Jul. 9, 2014

(65) Prior Publication Data

US 2015/0143302 A1    May 21, 2015

(30) Foreign Application Priority Data

Nov. 15, 2013    (KR) .......................... 10-2013-0139064

(51) Int. Cl.
*G06F 3/0481*    (2013.01)
*G06F 17/30*    (2006.01)
*G06Q 30/02*    (2012.01)

(52) U.S. Cl.
CPC .... *G06F 3/04815* (2013.01); *G06F 17/30864* (2013.01); *G06Q 30/0256* (2013.01)

(58) Field of Classification Search
CPC ................................................ G06F 3/04815

(Continued)

(56) References Cited

U.S. PATENT DOCUMENTS 6,348,927 B1* 2/2002 Lipkin ................... H04L 67/02
345/419
6,549,949 B1* 4/2003 Bowman-Amuah ... H04L 69/06
709/236

(Continued)

FOREIGN PATENT DOCUMENTS

JP    2002-334123 A    11/2002
KR    1019990023360 A    3/1999

(Continued)

OTHER PUBLICATIONS

Gupta, Apurva; "I-Sphere: A Virtual Reality Based 3D Interactive Web Navigation Interface"; 11th Asia Pacific Conference on Computer Human Interaction (APCHI2013); Sep. 26, 2013; pp. 1-54.

*Primary Examiner* — Reza Nabi
(74) *Attorney, Agent, or Firm* — Alston & Bird LLP

(57) ABSTRACT

A method of providing a virtual reality-based three-dimensional interface for a web object search and a real time metadata representations and a web search system using the three-dimensional interface thereof are provided. In this method, a plurality of nodes each in which a node identification label string to which an information page is linked is together written and a plurality of links connecting the plurality of nodes, respectively, are displayed in a three-dimensional form that is either static or spinning. Thereafter, by performing an action of reduction, enlargement, movement, rotation, expanding, hiding, removal, and addition in a three-dimensional object that is formed with the node and the link that are displayed in the three-dimensional form according to a user input, the three-dimensional object is displayed or an information page that is linked to a node that is selected by the user is displayed.

19 Claims, 10 Drawing Sheets

(58) Field of Classification Search
USPC .......................................................... 715/849
See application file for complete search history.

(56) References Cited

U.S. PATENT DOCUMENTS

| | | | | |
|---|---|---|---|---|
| 6,560,511 B1* | 5/2003 | Yokoo | ................... | A63H 11/00 |
| | | | | 318/568.11 |
| 6,934,906 B1* | 8/2005 | Cheok | ............... | H04N 21/23412 |
| | | | | 345/419 |
| 7,086,005 B1* | 8/2006 | Matsuda | ............... | H04M 7/003 |
| | | | | 715/706 |
| 8,033,832 B1* | 10/2011 | Stefan | ................. | G09B 23/281 |
| | | | | 382/128 |
| 8,352,465 B1* | 1/2013 | Jing | ................. | G06F 17/30867 |
| | | | | 707/723 |
| 8,577,911 B1* | 11/2013 | Stepinski | ................ | G06F 17/30 |
| | | | | 707/765 |
| 2004/0239679 A1* | 12/2004 | Ito | ........................... | G06T 15/00 |
| | | | | 345/555 |
| 2004/0249809 A1* | 12/2004 | Ramani | ............ | G06F 17/30259 |
| 2005/0160014 A1* | 7/2005 | Moss | ..................... | G06Q 30/00 |
| | | | | 705/26.61 |
| 2006/0129574 A1* | 6/2006 | Shin | ....................... | G06F 17/50 |
| 2007/0070066 A1* | 3/2007 | Bakhash | ............ | G06F 3/04815 |
| | | | | 345/419 |
| 2007/0192305 A1* | 8/2007 | Finley | ............... | G06F 17/30693 |
| 2008/0246757 A1* | 10/2008 | Ito | ........................... | G06T 15/10 |
| | | | | 345/419 |
| 2008/0260918 A1* | 10/2008 | Lai | ..................... | B29C 67/0081 |
| | | | | 426/231 |
| 2008/0294401 A1* | 11/2008 | Tsin | .................... | G06F 17/5095 |
| | | | | 703/8 |
| 2009/0100352 A1* | 4/2009 | Huang | ............. | G06F 17/30893 |
| | | | | 715/757 |
| 2009/0157649 A1* | 6/2009 | Papadakis | ......... | G06F 17/30259 |
| 2010/0106752 A1* | 4/2010 | Eckardt, III | ...... | G06F 17/30696 |
| | | | | 707/805 |
| 2011/0055203 A1 | 3/2011 | Gutt et al. | | |
| 2011/0078603 A1* | 3/2011 | Koomullil | ......... | G06F 17/30386 |
| | | | | 715/769 |
| 2011/0083078 A1* | 4/2011 | Ju | ......................... | G06F 3/0481 |
| | | | | 715/738 |
| 2013/0061165 A1* | 3/2013 | Adkins | ............. | G06F 17/30905 |
| | | | | 715/780 |
| 2013/0120378 A1* | 5/2013 | Miller | .................... | G06T 15/00 |
| | | | | 345/420 |
| 2013/0125029 A1* | 5/2013 | Miller | ................. | G06F 9/45529 |
| | | | | 715/760 |
| 2013/0132466 A1* | 5/2013 | Miller | .................... | H04L 67/02 |
| | | | | 709/203 |
| 2013/0149684 A1* | 6/2013 | Ezzell | .................... | G09B 23/28 |
| | | | | 434/272 |
| 2013/0151509 A1* | 6/2013 | Tran | ................. | G06F 17/30905 |
| | | | | 707/723 |
| 2014/0056391 A1* | 2/2014 | Lee | ....................... | H04L 1/0054 |
| | | | | 375/341 |
| 2014/0195515 A1* | 7/2014 | Baker | ............... | G06F 17/30572 |
| | | | | 707/722 |
| 2014/0344230 A1* | 11/2014 | Krause | ............. | G06F 17/30867 |
| | | | | 707/693 |
| 2015/0143302 A1* | 5/2015 | Chang | ................. | G06F 3/04815 |
| | | | | 715/849 |
| 2015/0169636 A1* | 6/2015 | Ovsjanikovs | ..... | G06F 17/30256 |
| | | | | 707/722 |
| 2015/0178321 A1* | 6/2015 | Rivlin | ............... | G06F 17/30277 |
| | | | | 707/728 |

FOREIGN PATENT DOCUMENTS

| | | |
|---|---|---|
| KR | 1020000037795 A | 7/2000 |
| KR | 10-2012-0073216 A | 7/2012 |

\* cited by examiner (A)

(B)

(C)

(A)

(B)

(A)

(B)

(A)

(B)

METHOD OF PROVIDING VIRTUAL REALITY BASED THREE-DIMENSIONAL INTERFACE FOR WEB OBJECT SEARCHES AND REAL-TIME METADATA REPRESENTATIONS AND WEB SEARCH SYSTEM USING THE THREE-DIMENSIONAL INTERFACE

CROSS-REFERENCE TO RELATED APPLICATION

This application claims priority to and the benefit of Korean Patent Application No. 10-2013-0139064 filed in the Korean Intellectual Property Office on Nov. 15, 2013, the entire contents of which are incorporated herein by reference.

BACKGROUND OF THE INVENTION (a) Field of the Invention

The present invention relates to a method of providing a virtual reality-based three-dimensional interface for a web object search and a real time metadata representations and a web search system using the three-dimensional interface thereof.

(b) Description of the Related Art

A search interface of a general web site commonly has an information classification system of a tree structure. For example, in a procedure in which a user searches for new type mixer product information in an online electronic commerce, a customer performs a manipulation according to a series of information system such as entering of a portal page of a corresponding shopping mall on a web, selection of household items, selection of kitchen appliances, selection of kitchen electronic appliances, and selection of a mixer.

An information search of such a tree structure is very general, and because a user should perform a web search through an information search frame of a two-dimensional tree structure that is displayed through an interface, the user cannot entirely view an information search available area on a web and thus a search range is limited, and thus for a search of a wide range, the user should inconveniently move to the top and the bottom or the front and the back step by step on a tree structure.

Therefore, a more useful interface is requested for a web search.

The above information disclosed in this Background section is only for enhancement of understanding of the background of the invention and therefore it may contain information that does not form the prior art that is already known in this country to a person of ordinary skill in the art.

SUMMARY OF THE INVENTION

The present invention has been made in an effort to provide a method of providing a virtual reality-based three-dimensional interface and a web search system using the three-dimensional interface thereof for a web object search and a real time meta data representations that can amplify convenience and reality on an information search process through a direct three-dimensional interface object manipulation of a user and metadata mapping that is linked to visual attributes of nodes and links on a three-dimensional interface while entirely viewing an information search available area through the three-dimensional interface that is displayed based on virtual reality.

An exemplary embodiment of the present invention provides a method of providing a virtual reality-based three-dimensional interface, the method including: displaying a plurality of nodes each in which a node identification label string to which an information page is linked is together written and a plurality of links that connect the plurality of nodes, respectively, in a three-dimensional form that is either static or spinning, and displaying a three-dimensional object or displaying an information page that is linked to a node that is selected by a user by performing an action of reduction, enlargement, movement, rotation, expanding, hiding, removal, and addition through a user input in the three-dimensional object that is formed with the node and the link that are displayed in the three-dimensional form according to a user input.

The plurality of nodes and a plurality of links may form the three-dimensional object through one of a tree structure, a network structure, or a hybrid structure in which the tree structure and the network structure are mixed.

The three-dimensional interface may be displayed through a screen of a display, and the screen may include a three-dimensional interface screen that displays the three-dimensional object and a keymap window that enables to know a location in which the three-dimensional object that is displayed on the three-dimensional interface screen belongs to an entire construction body while displaying the entire construction body.

The three-dimensional interface screen may differently apply and display a screen ratio of the three-dimensional interface screen and a selected information page screen according to whether selection of complexity and the number of nodes that are displayed on the screen when one node of the three-dimensional object is selected and when an information page screen in which an information page that is linked thereto is displayed is simultaneously formed on the display screen.

The plurality of nodes may be displayed by an attribute of at least one of: a size attribute that has user designation information that is linked to a node size such as a size corresponding to the accumulation number of users that have visited an information page that is linked to each node or an accumulated sales volume of a product that is linked to a corresponding node; a color attribute that has user designation information that is linked to whether maleficence of a website that is linked to each node or a maleficence level, popularity of a corresponding website that is calculated based on the visit frequency of users who have visited a corresponding website, or a node color such as a color according to a characteristic classification of contents in which a corresponding website contains; and a blinking attribute that has user designation information that is linked to blinking of a node such as blinking so as to represent that a website that is linked to each node is updating or that a product that is linked to a corresponding website is on sale.

The plurality of links may be displayed by an attribute of at least one of: a thickness attribute that displays user designation information that is linked to a thickness of a link such as strength of association between web objects that are represented with two nodes of both ends to which each link is connected; a length attribute that displays user designation information that is linked to a link length such as a physical length between two nodes of both ends to which each link is connected; a color attribute that represents user designation information that is linked to a color of a link such as a relationship of two nodes of both ends to which each link is connected; and a blinking attribute that represents user designation information that is linked to blinking of a link such as whether a change of association of two nodes of both ends to which each link is connected.

The each node may display simplified version information of a call out form that is linked to a corresponding node, when a user clicks or puts a cursor of a mouse on the corresponding node so as to assist a selection by the user.

The method may further include displaying an information page that is linked to the each node by directly selecting each node or by selecting each node through the call out.

The method may further include selecting a node that is displayed on the three-dimensional interface screen and enlarging or reducing the three-dimensional interface screen by displaying subordinate nodes of the selected node on the three-dimensional interface screen or by removing subordinate nodes of the selected node on the three-dimensional interface screen.

Subordinate nodes may be displayed on the three-dimensional interface screen in a pop-up form by setting the specific node to a new root node, if a specific node or subordinate nodes of the specific node are displayed with a distinguished method of click or double click by distinguishing a movement to a web object or a web document that is interlocked with the specific node with a distinguished method of click or double click from a case in which a user selects, when the specific node is selected for extension on the three-dimensional interface screen, and subordinate nodes that have been branched and extended from a corresponding node may be removed and a screen before the specific node is extended is again displayed, when the specific node that is extended and displayed in a pop-up form on the three-dimensional interface screen is selected with a distinguished method of click or double click.

Extension of the three-dimensional interface screen may include displaying nodes that are not displayed by being temporarily hidden on the three-dimensional interface screen or that are displayed on the three-dimensional interface screen and that are displayed on the keymap window among nodes in which recognition is difficult in a viewing angle of a three-dimensional object or in a visual configuration form on the three-dimensional interface screen by selection on the keymap window and performing a web search based on the display.

A ratio between an occupying area of the three-dimensional search interface in which the three-dimensional interface screen is formed with coupling of three-dimensional nodes and links about the specific node that is selected when a node is extended on the three-dimensional interface screen and an area that displays a linked information document when a user selects one of these nodes may be dynamically converted and displayed.

A three-dimensional object may be displayed on the three-dimensional interface screen, and an entire shape thereof that is formed with coupling of nodes and links constituting the three-dimensional object may be visualized through a three-dimensional connection body of one of a polyhedron, a spherical shape, 3D mesh, or any irregular form.

Another embodiment of the present invention provides a web search system that provides a virtual reality-based three-dimensional web search interface, the web search system including: an input and output interface unit that displays a three-dimensional object including a plurality of nodes each to which an information page is linked and a plurality of links that connect the plurality of nodes, respectively, in a three-dimensional form, either static or spinning, and that displays an information page that is linked to the node according to a user input; a metadata processor that visually displays the node and the link based on metadata that are linked to visual attributes of the plurality of nodes and the plurality of links; and a web server that controls the input and output interface and the metadata processor to provide a virtual reality-based three-dimensional web search interface to a user and that obtains a corresponding information page according to a user selection through the input and output interface to provide the information page through the input and output interface unit.

The web search system may further include: a search history database that stores information on a user basis including a user search history, a bookmark, or a preference node through the three-dimensional web search interface; and a retention management unit that generates a three-dimensional object that is displayed in the input and output interface unit and that performs retention management of metadata for a visual attribute processing of nodes and links in the metadata processor.

The input and output interface unit may include: a Virtual Reality Modeling Language (VRML) or X3D browser that visualizes a file including the three-dimensional object that is constructed in a virtual reality form into an actual three-dimension screen based on a user manipulation; a Hypertext Markup Language (HTML) document output device that outputs an information page that is linked to a node in which a user selects on the three-dimensional web search interface on a screen; and a web browser including a node filter requirement input device that receives information reading filter conditions in which a user selects to transfer the conditions to the VRML or X3D browser.

The retention management unit may generate a corresponding VRML file and HTML file through modeling of the three-dimensional object and perform an HTML document edition that is linked to nodes and a VRML object edition for updating a visual attribute processing of nodes and links in the metadata processor in real time or in semi-real time to correspond to information attributes changing in real time on a web.

The web server may include: the HTML file and a VRML file existing in an independent form or existing within the HTML file; and a controller that provides the three-dimensional web search interface through the input and output interface unit using the VRML file and the HTML file and that performs a visual attribute control of nodes and links on the three-dimensional web search interface through the metadata processor and that manages a search history of users.

The retention management unit may include: a three-dimensional object modeler that models a three-dimensional object; a VRML file converter that converts the three-dimensional object that is modelled by the three-dimensional object modeler to a VRML file so as to convert to a virtual reality object; a VRML object editor that maps reaction forms for converting a visual attribute of each node or links based on information that is input from the metadata processing unit and user manipulation actions including operation of reduction, enlargement, movement, rotation, expanding, hiding, removal, and addition of VRML objects that are included in a VRML file that is converted by the VRML file converter; an HTML document editor that writes an HTML document that contains hypertext-based information that is linked to a node, when the node is selected by integrating a VRML file that is edited by the VRML object editor with an HTML file; and a manager interface that provides an interface that enables to perform a retention management work by accessing to retention management related constituent elements of the web search system.

The retention management unit may perform a VRML object edition for making and providing a three-dimensional interface of a version for a user, when a specific user is connected to perform visualization through a color change or blinking of a node to nodes in which the user has visited or that has the high visit frequency or nodes having a high interest on each user basis including a node in which the user directly selects as an interest node.

According to the present invention, because an information search available area can be entirely viewed through a three-dimensional interface that is displayed based on virtual reality, a web search is more convenient.

Further, a reality feeling in an information search process is amplified.

Further, more information can be searched for through an information node density that is enlarged to a three-dimension.

DETAILED DESCRIPTION OF THE EMBODIMENTS

Figure 1:
FIG. 1 is a diagram illustrating an example of a three-dimensional interface of a tree structure according to an exemplary embodiment of the present invention.
Figure 1:
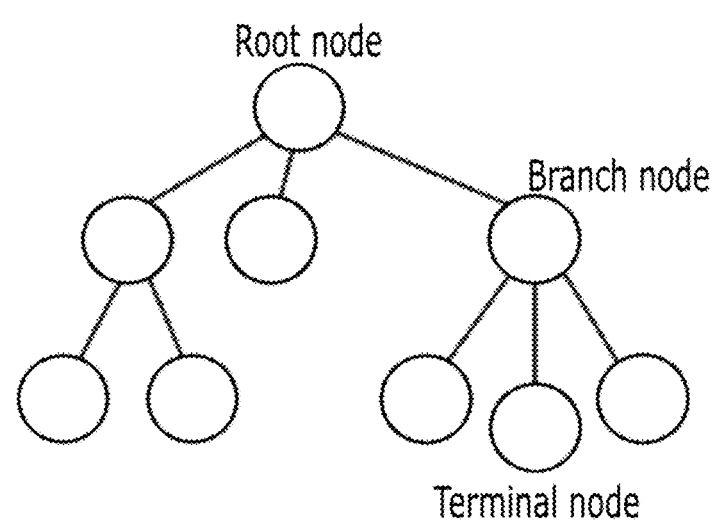

In the following detailed description, only certain exemplary embodiments of the present invention have been shown and described, simply by way of illustration. As those skilled in the art would realize, the described embodiments may be modified in various different ways, all without departing from the spirit or scope of the present invention. Accordingly, the drawings and description are to be regarded as illustrative in nature and not restrictive. Like reference numerals designate like elements throughout the specification.

In addition, in the entire specification, unless explicitly described to the contrary, the word "comprise" and variations such as "comprises" or "comprising", will be understood to imply the inclusion of stated elements but not the exclusion of any other elements. In addition, the terms "-er", "-or", and "module" described in the specification mean units for processing at least one function and operation and can be implemented by hardware components or software components and combinations thereof.

Hereinafter, a virtual reality three-dimensional interface-based web search system and a web search method thereof according to an exemplary embodiment of the present invention will be described in detail.

First, a basic node and link constituting a web search interface of a three-dimensional form, either static or spinning, that is formed with a plurality of links and nodes in which a user can directly freely move or rotate using a mouse and virtual reality technique according to an exemplary embodiment of the present invention will be described.

First, a node represents a Uniform Resource Locator (URL) or an address that connects a hypertext web document or a specific site on a web, and entire nodes have three visual attributes of at least a size, shape, color, texture, transparency and blinking.

These three visual attributes may represent various additional information according to meaning assignment that is designated by a manager of each constructed interface.

For example, a size of a node may represent the accumulated number of users that have visited a web page that is connected to a corresponding node or an accumulated sales volume of a product that is linked to a corresponding web page.

Further, a color of a node may represent whether maleficence of a corresponding web site or a maleficence level or may be linked to popularity of a corresponding site that is calculated based on the visit frequency of general users or a specific user who has visited a corresponding site or characteristic classification of contents in which a corresponding site contains.

Further, visual attributes may be represented with information in which a corresponding website is updating, in which a product that is linked to a corresponding website is on sale, or in which a new product is added to the shopping mall that sells several products through whether blinking of each node or a blinking interval or a method of displaying a root node or a terminal node among a cluster of nodes and links constituting a virtual reality-based three-dimensionally web search interface that is displayed on a screen.

A meaning in which three visual attributes of the each node represent may be frequently changed by a manager, as needed, and in order for users to easily know a meaning of node related attributes that are changed by the manager, a separate description is provided through a screen.

Nodes are connected by a link, and such a link has visual attributes such as a thickness, a length, a color, and blinking, and a specific meaning may be given to each of these visual attributes.

For example, a thickness of a link may display strength of association between web objects that are represented with two nodes of both ends of a link, and a length of a link may display a physical or meaning distance between nodes of both ends.

Further, a color of a link represents a characteristic of a relationship between nodes of both ends. For example, when two nodes of both ends are a homepage on a Social Networking Service (SNS) that introduces two persons, which are a lover relationship, a pink link may represent a relationship thereof. Further, visual attributes may be represented with a method of displaying information in which a change occurs in association between nodes of both ends to users through whether blinking of a link or a blinking interval.

As described above, a topological coupling method of nodes and links constituting a virtual reality-based three-dimensional interface according to an exemplary embodiment of the present invention may have three structures of at least a tree structure, network structure, and hybrid structure. Various structures that may represent of a virtual reality-based three-dimensional interface according to an exemplary embodiment of the present invention may be used in addition to the three structures.

Figure 2:
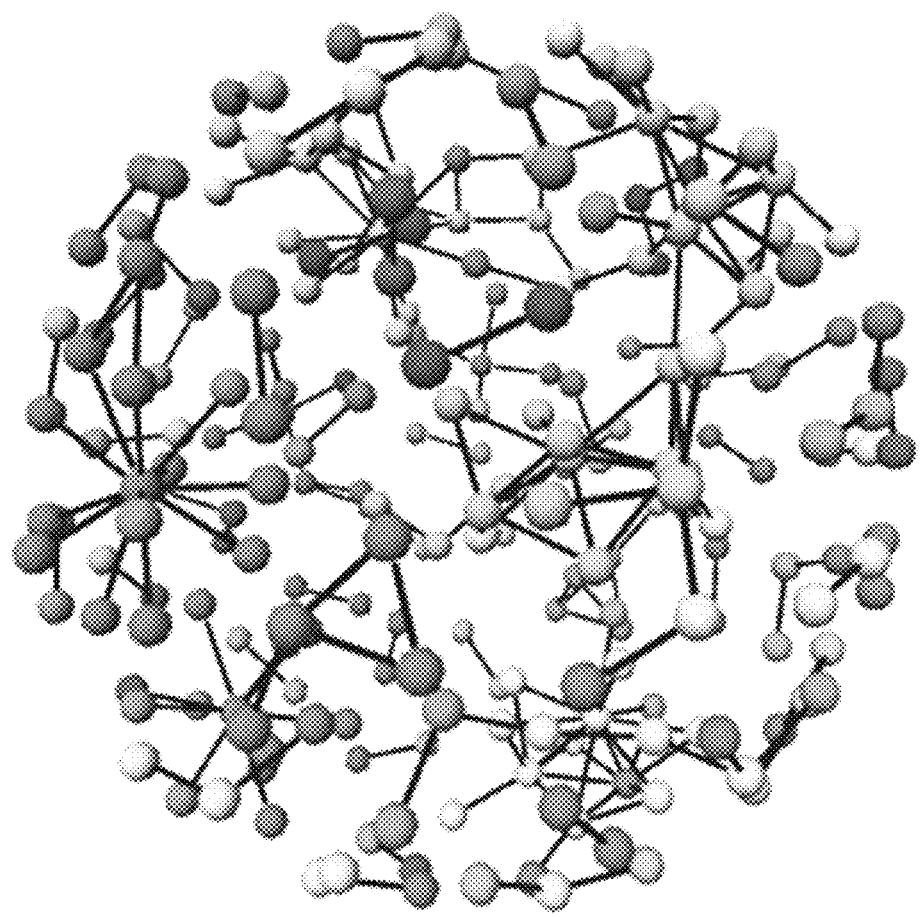
FIG. 2 is a diagram illustrating an example of a three-dimensional interface of a network structure according to an exemplary embodiment of the present invention.
Figure 2:
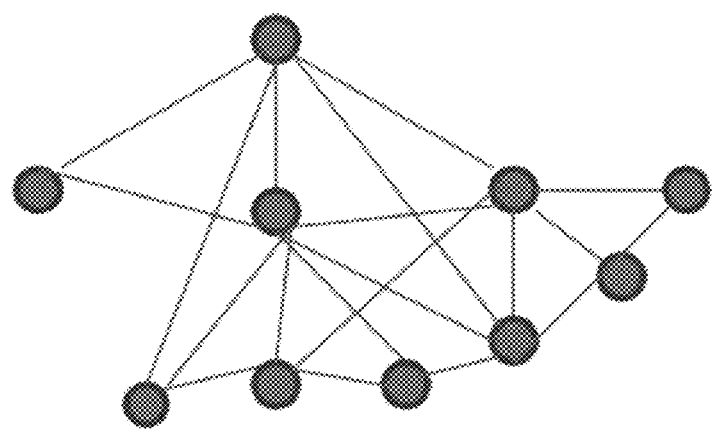
Figure 3:
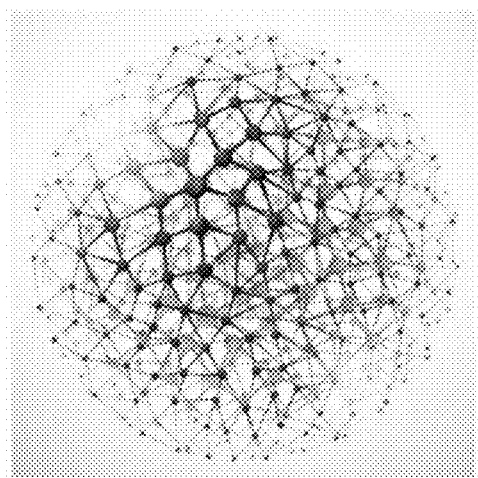
FIG. 3 is a diagram illustrating an example of a three-dimensional interface of a hybrid structure according to an exemplary embodiment of the present invention.
Figure 3:
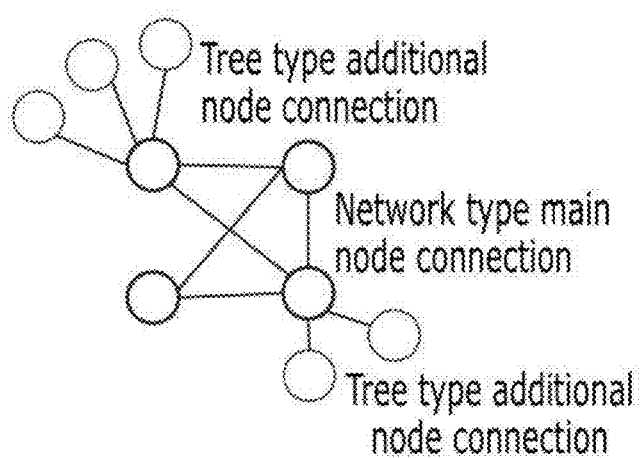
Figure 3:
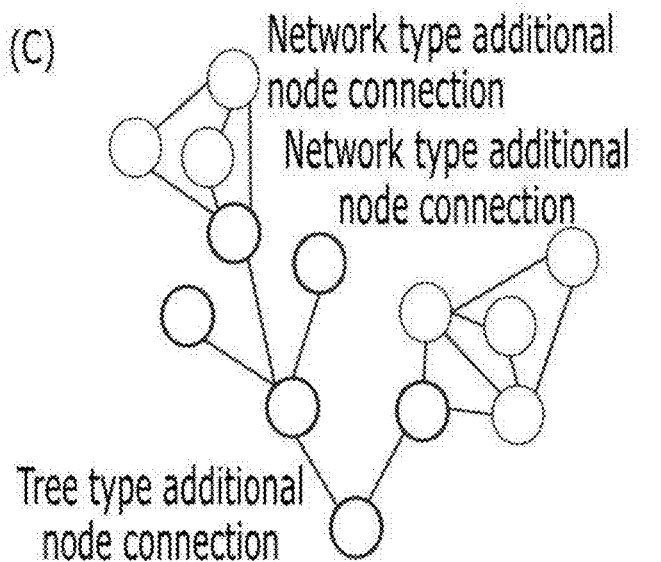

FIG. 1 is a diagram illustrating an example of a three-dimensional interface of a tree structure according to an exemplary embodiment of the present invention, FIG. 2 is a diagram illustrating an example of a three-dimensional interface of a network structure according to an exemplary embodiment of the present invention, and FIG. 3 is a diagram illustrating an example of a three-dimensional interface of a hybrid structure according to an exemplary embodiment of the present invention. First, as shown in FIG. 1, a tree structure has a structure form in which nodes are branched in a tree form according to a series of system and includes a root node, a branch node, and a terminal node. Here, the root node indicates a top node of a tree structure, the branch node indicates a node having at least one child node in a tree structure, and the terminal node indicates a node in which the branch number is 0, i.e., a node that is located at the end of the branch node among nodes of a tree. Such a tree structure is well known and thus a detailed description thereof will be omitted.

An information system configuration of online user participation type web content site or a newly appeared social network service such as Facebook, LinkedIn, Cyworld, tweeter, YouTube, and Wikipedia is a network structure instead of the tree structure, as shown in FIG. 2 and in such a network structure, a connection between nodes may be dynamically changed in a form in which each node is freely connected to any other node.

Further, another method of coupling nodes and links in a virtual reality-based three-dimensional interface according to an exemplary embodiment of the present invention is a hybrid method of mixing a connection method of the tree structure and network structure.

In such a hybrid method, three subordinate forms of a tree and network coupling structure, a tree internal type network structure, and a network internal type tree structure exist.

First, as shown in FIG. 3A, the tree and network coupling structure has a method in which nodes and links are randomly coupled in a form in which a tree structure or a network structure are mixed, and as shown in FIG. 3B, the tree internal type network structure is a method in which subordinate nodes that are connected in a tree structure exist at the inside of nodes that are coupled in a network form.

In contrast, as shown in FIG. 3C, the network internal type tree structure is a method in which subordinate nodes of a network structure exist at the inside of nodes that are basically connected in a tree structure.

Such hybrid methods may be selectively applied according to a frame work of an organization or an information characteristic of a web site in which a virtual reality-based three-dimensional web search interface is used.

Hereinafter, a system that provides a web search based on a virtual reality three-dimensional interface using the nodes and links will be described in detail.

Figure 4:
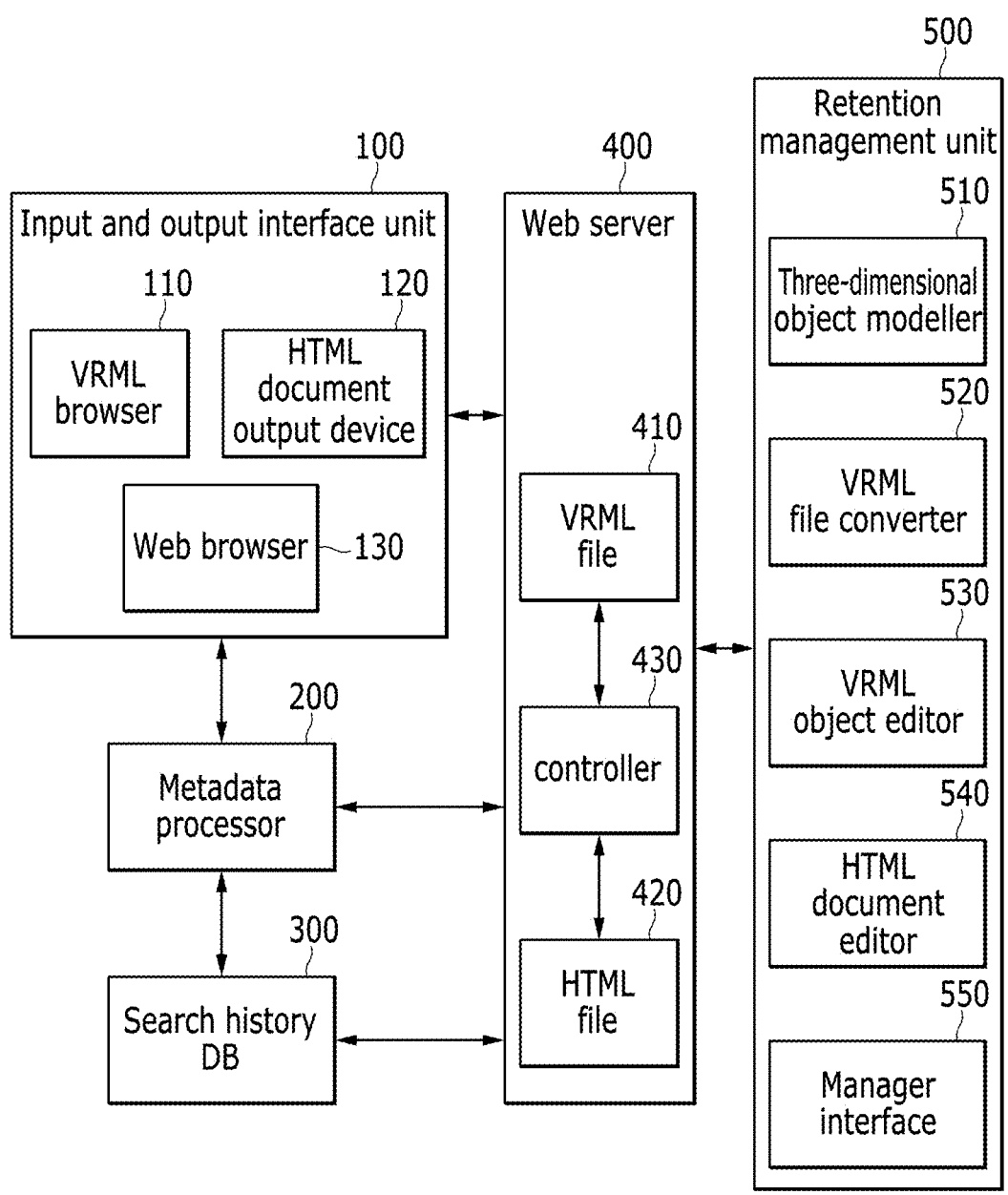
FIG. 4 is a block diagram illustrating a configuration of a virtual reality three-dimensional interface-based web search system according to an exemplary embodiment of the present invention.

FIG. 4 is a block diagram illustrating a configuration of a virtual reality three-dimensional interface-based web search system according to an exemplary embodiment of the present invention.

Referring to FIG. 4, a virtual reality three-dimensional interface-based web search system 10 according to an exemplary embodiment of the present invention includes an input and output interface unit 100, a metadata processor 200, a search history database (hereinafter, referred to as a "DB") 300, a web server 400, and a retention management unit 500.

The input and output interface unit 100 provides a virtual reality-based three-dimensional web search interface to a user using the tree structure, the network structure, or the hybrid structure.

Such an input and output interface unit 100 includes a Virtual Reality Modeling Language (VRML) browser 110 that visualizes a file including a three-dimensional web search interface object that is constructed in a virtual reality form in an actual three-dimensional screen based on a user manipulation, a Hypertext Markup Language (HTML) document output device 120 that outputs an information file of a hypertext form that is linked to a node in which a user selects on the virtual reality-based three-dimensional web search interface on a screen, and a web browser 130 including a node filter requirement input device that receives information reading filter conditions in which a user selects to transfer the information reading filter conditions to the VRML browser 110.

Next, the metadata processor 200 supports a work that obtains in real time metadata that are linked to visual attributes of nodes and links expressing web objects in which a user is searching and that transfers the metadata to the VRML browser 110 and that dynamically changes and visualizes a visual attribute of corresponding nodes and links.

When the search history DB 300 receives and stores individualized information such as a user's web search history, a bookmark, and preference nodes from the web browser 130 or when a user searches for again nodes in which web search history data are stored, the search history DB 300 performs a function of visually displaying such history information on a virtual reality-based three-dimensional web search interface.

The web server 400 controls the input and output interface unit 100, the metadata processor 200, and the search history DB 300 to provide a virtual reality-based three-dimensional web search interface and contents to the user. For this purpose, the web server 400 includes VRML files 410 and HTML files 420 existing within a HTML file or existing in an independent form, provides a virtual reality-based three-dimensional web search interface through the input and output interface unit 100 using the VRML file 410 and the HTML file 420, and includes a controller 430 that performs a visual attribute control of nodes and links on a virtual reality-based three-dimensional web search interface through the metadata processor 200 and that controls and manages the search history DB 300 through a search history of users.

The retention management unit 500 generates the VRML file 410 and the HTML file 420 through modeling of a three-dimensional object, which is a core of a virtual reality-based three-dimensional web search interface through the web server 400 and performs a work necessary for a VRML object edition for a visual attribute processing of nodes and links of the metadata processor 200 and an HTML document edition that is connected to nodes and retention management of the system 10 according to an exemplary embodiment of the present invention. Here, a three-dimensional object includes a connection body of nodes and links and a label that describes each node.

The retention management unit 500 includes a three-dimensional object modeller 510, a VRML file converter 520, a VRML object editor 530, a HTML document editor 540, and a manager interface 550.

The three-dimensional object modeller 510 models a three-dimensional object, which is core of a virtual reality-based three-dimensional web search interface.

In order to convert a three-dimensional object that is modeled by the three-dimensional object modeller 510 to a virtual reality object, the VRML file converter 520 converts the three-dimensional object to the VRML file.

The VRML object editor 530 maps various latent manipulation actions of a user such as reduction, enlargement, movement, rotation, expanding, hiding, removal, and addition of VRML objects that are included in a VRML file that is converted by the VRML file converter 520 and various reaction forms for converting an visual attribute of each node or links based on information that is input from the metadata processor 200.

The HTML document editor 540 integrates a VRML file that is edited by the VRML object editor 530 with an HTML file, and when specific nodes are selected, and the HTML document editor 540 writes a HTML document that contains hypertext-based information that is linked to the nodes.

The manager interface 550 provides an interface that enables a manager to access to retention management related constituent elements of these various systems and to perform a necessary work.

When a user first accesses to the web search system 10 according to an exemplary embodiment of the present invention, in order to activate a VRML interface, a case of downloading and installing separate software plugin that is related to VRML or open GL may occur.

Hereinafter, a web search interface in which the virtual reality three-dimensional interface-based web search system 10 according to an exemplary embodiment of the present invention provides will be described in detail.

Figure 5:
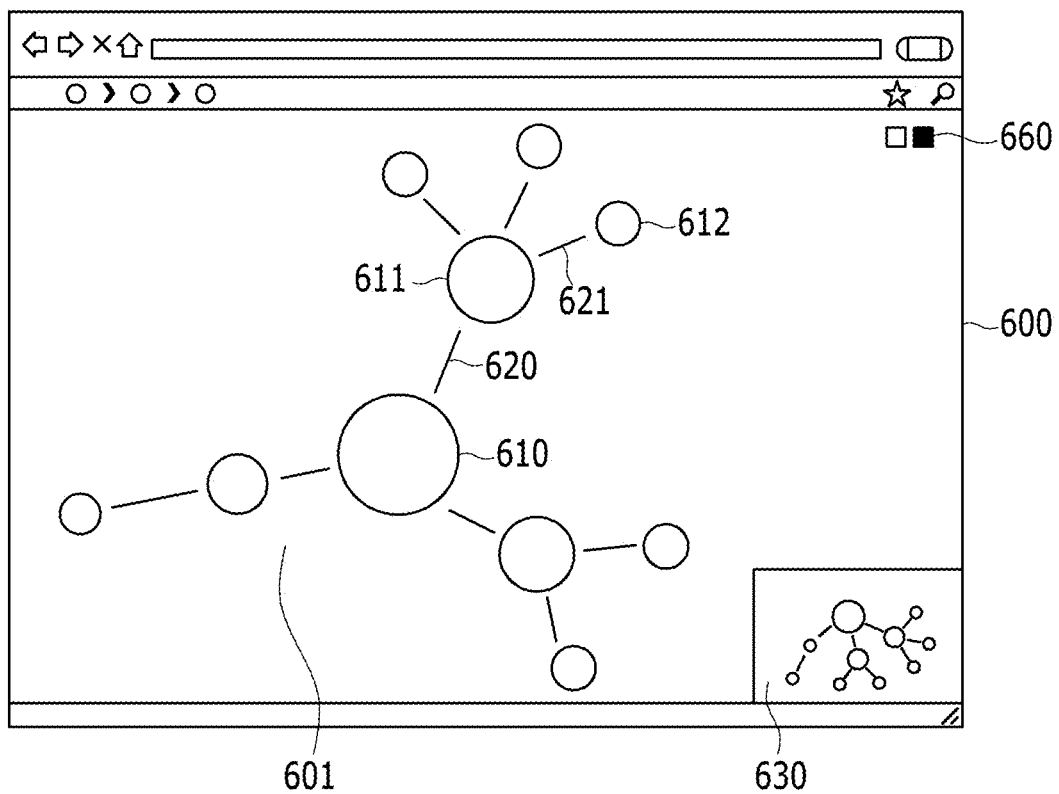
FIG. 5 is a diagram illustrating a screen of a virtual reality-based three-dimensional web search interface according to an exemplary embodiment of the present invention.
Figure 6:
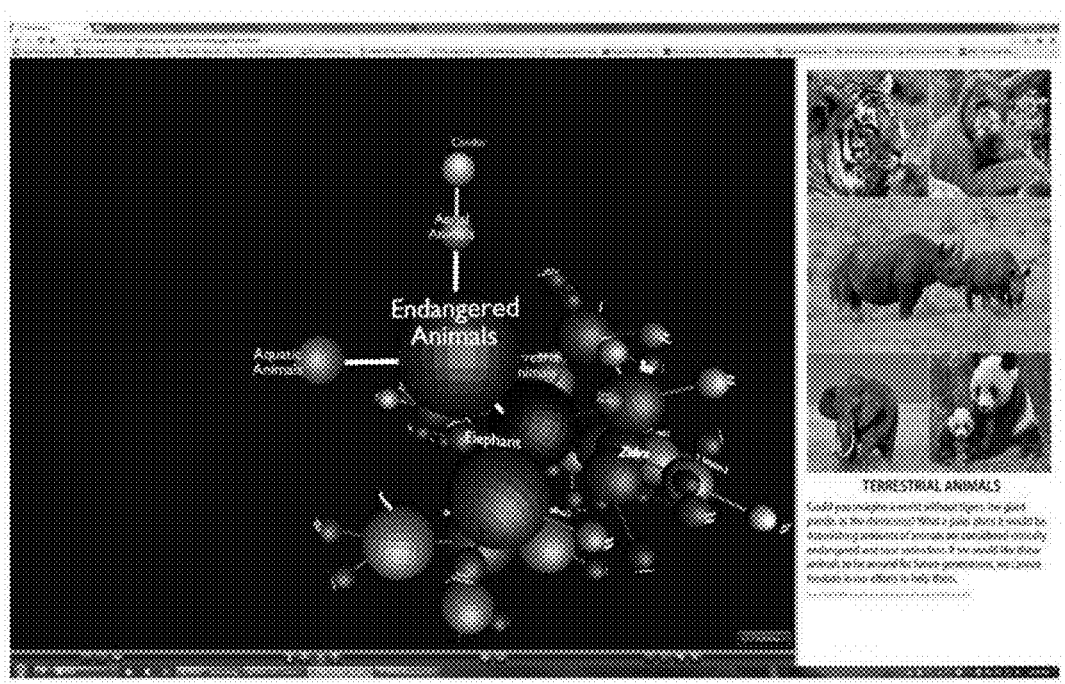
FIG. 6 is a diagram illustrating a three-dimensional expression example of a virtual reality-based three-dimensional web search interface according to an exemplary embodiment of the present invention.

FIG. 5 is a diagram illustrating a screen of a virtual reality-based three-dimensional web search interface according to an exemplary embodiment of the present invention, and FIG. 6 is a diagram illustrating a three-dimensional expression example of a virtual reality-based three-dimensional web search interface according to an exemplary embodiment of the present invention.

Referring to FIG. 5, a virtual reality-based three-dimensional web search interface 600 according to an exemplary embodiment of the present invention is formed based on a three-dimensional object that is formed with nodes 610, 611, and 612 and links 620 and 621 in which a user can perform a manipulation such as rotation, movement, enlargement, reduction, expanding and hiding through an input means such as a mouse unlike a two-dimensional web search menu configuration based on an existing character string or a graphic icon.

Therefore, the virtual reality-based three-dimensional web search interface 600 according to an exemplary embodiment of the present invention may express the nodes 610, 611, and 612 representing web objects of the much many number, compared with a two-dimensional web search interface and by displaying entire web objects that are related to information in which a user wants on a screen in one time, while viewing association between such web objects, the virtual reality-based three-dimensional web search interface 600 is formed to access to desired web object information in an interactive method.

In this way, in the virtual reality-based three-dimensional web search interface 600, the reason in which the number of web objects that can receive is much many, compared with an existing two-dimensional web search interface may be known with a difference between a circle and a sphere or a difference between a quadrangle and a hexahedron. That is, when it is assumed that nodes for an information search are disposed with a constant density within a circle and a quadrangle, which are a two-dimensional object, an exemplary embodiment of the present invention uses a three-dimension in which one dimension is added to such a two-dimensional object and has an enlarged node density in which an amount that is extended to a three-dimension is multiplied to a given node density in a two-dimensional interface, and by accessing and selecting such a three-dimensional web search interface to any of the nodes 610, 611, and 612 within an interface through methods that can be manipulated with virtual reality technique, a user may arrive in a desired information object.

It is a rule that the virtual reality-based three-dimensional web search interface 600 according to an exemplary embodiment of the present invention displays entire nodes including entire web objects of a corresponding web site on one screen, but when the number of nodes that should be displayed is so much or when complexity of a node-link coupling body of a tree structure, a network structure, or a hybrid structure is so large, by using a method of dynamically adjusting a size or a node density of the three-dimensional web search interface 600, expressing to enlarge nodes of a specific portion, reducing or covering other portions, or displaying clusters of constantly grouped nodes in step on a screen according to a user selection, entire information objects can be searched for. In an example of FIG. 5, in a construction body of an entire node, when a user searches for a cluster of nodes corresponding to a portion, in order to estimate a location of nodes in which the user is presently searching at the entire location, an entire construction body may be displayed through a separate two-dimensional keymap window 630. In the keymap window 630, nodes that are displayed with an appropriate information density and a label that describes each node are expressed, and a corresponding location of nodes in which a user is presently searching for in the label may be visualized in real time.

A screen of the virtual reality-based three-dimensional web search interface 600 according to an exemplary embodiment of the present invention of FIG. 5 illustrates a case of a tree structure.

A method in which a user performs a web search through the virtual reality-based three-dimensional web search interface 600 of FIG. 5 will be described in detail.

When the three-dimensional web search interface 600 that is displayed on a screen does not display an entire node due to a limitation of a screen size, the web search system 10 according to an exemplary embodiment of the present invention notifies a user that terminal nodes that can be additionally extended can be extended with a blinking method.

Figure 7:
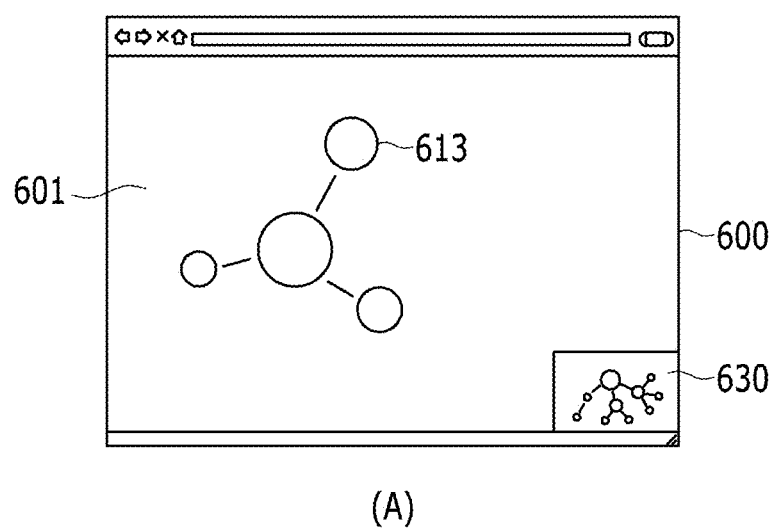
FIG. 7 is a diagram illustrating a node extension example of a virtual reality-based three-dimensional web search interface according to an exemplary embodiment of the present invention.
Figure 7:
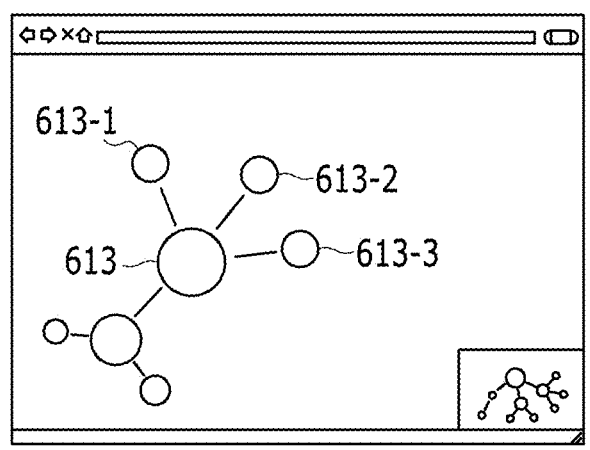

FIG. 7 is a diagram illustrating a node extension example of a virtual reality-based three-dimensional web search interface according to an exemplary embodiment of the present invention.

Referring to FIG. 7A, nodes that are displayed in a three-dimensional interface screen 601 are a portion of entire nodes that are displayed in the keymap window 630, and it is assumed that a node 613 is blinking to extend.

Therefore, when the user selects the blinking node 613 using a mouse, the input and output interface unit 100 of the web search system 10 extends and displays a node to subordinate nodes 613-1, 613-2, and 613-3 of the node 613 that is selected by the user, as shown in FIG. 7B. In this case, as shown in FIG. 7B, the entire of extended nodes together with existing displayed nodes may be displayed, but a series of nodes using the selected node 613 as a new root node are generated again on a screen in a pop-up form, and a connection body of existing displayed nodes on a screen is reduced with a method of including only nodes corresponding to each branch point or displaying only an existing root node and thus a user may concentrate on search of newly extended nodes.

Further, as described above, by enabling extended nodes to entirely disappear, when wanting to return to a previous state, by clicking and selecting the extended node 613 using a mouse, the user can return to a previous state. That is, when the user selects the extended node 613 on a screen of FIG. 7B, subordinate nodes of the node 613 disappear and the screen is returned to a previous state, as shown in FIG. 7A. In such an example, when the extended node becomes a root node, if the user clicks and selects the root node 613 of a newly generated node cluster in a pop-up form, while a cluster of extended nodes disappears, the node cluster is restored again and displayed like a previous screen.

When enabling the subordinate nodes 613-1, 613-2, and 613-3 to appear or disappear by selecting the node 613, the screen 601 may be dynamically converted with a viewpoint of the node 613 in which the user who selects the node 613 is selected to view an optimum screen.

Figure 8:
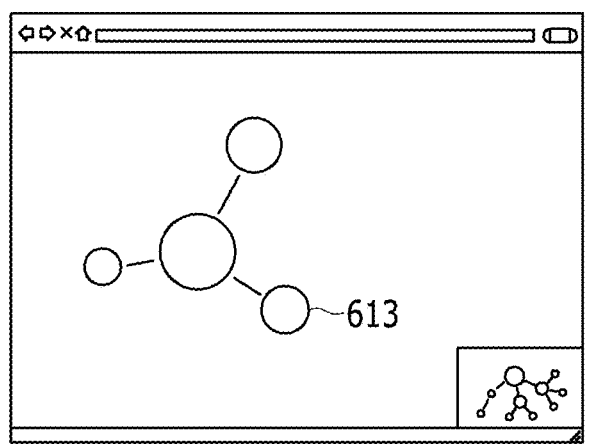
FIG. 8 is a diagram illustrating an example of a dynamic conversion of a screen when a node is extended in a virtual reality-based three-dimensional web search interface according to an exemplary embodiment of the present invention.
Figure 8:
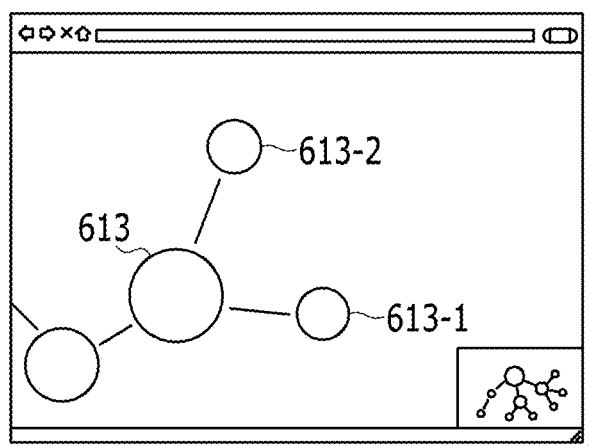

FIG. 8 is a diagram illustrating an example of a dynamic conversion of a screen when a node is extended in a virtual reality-based three-dimensional web search interface according to an exemplary embodiment of the present invention.

Referring to FIG. 8A, when the user selects the node 613, while the subordinate nodes 613-1 and 613-2 of the node 613 are displayed, as shown in FIG. 8B, it can be seen that the node 613 and the subordinate nodes 613-1 and 613-2 in which the screen 600 is selected are converted and displayed.

In a case of node extension, by selecting another node that is not displayed on the three-dimensional interface screen 601 but that is displayed in the keymap window 630, a node may be extended to display the selected node on the three-dimensional interface screen 601.

Figure 9:
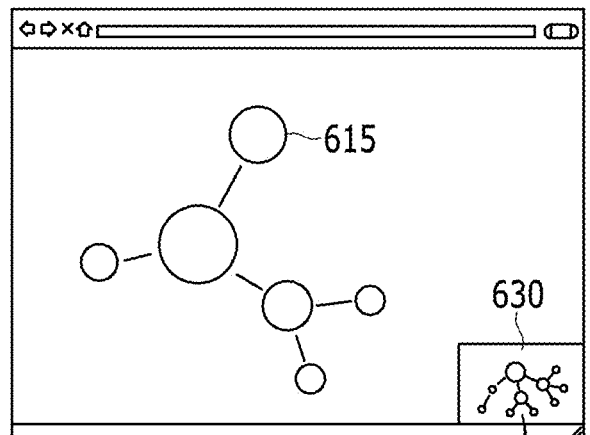
FIG. 9 is a diagram illustrating an example of a node extension through a keymap window in a virtual reality-based three-dimensional web search interface according to an exemplary embodiment of the present invention.
Figure 9:
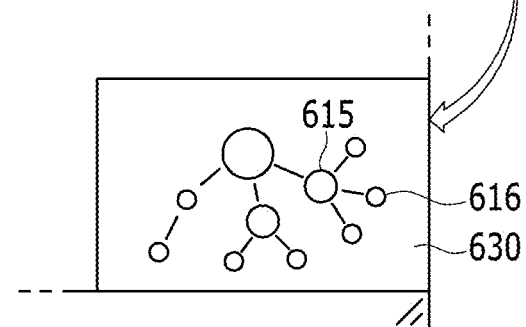
Figure 9:
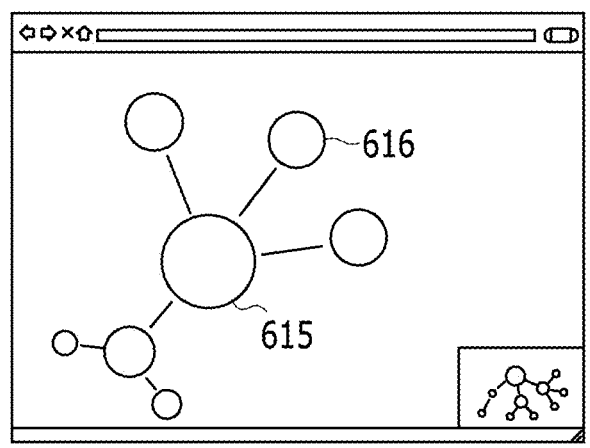

FIG. 9 is a diagram illustrating an example of a node extension through a keymap window in a virtual reality-based three-dimensional web search interface according to an exemplary embodiment of the present invention.

Referring to FIG. 9A, a node 615 is entirely displayed in the three-dimensional interface screen 601 and the keymap window 630, and a node 616, which is a subordinate node of the node 615 is displayed in the keymap window 630, but is not displayed on the three-dimensional interface screen 601. Therefore, as in the above example, the subordinate node 616 may be displayed through node extension by clicking the node 615 that is displayed on the three-dimensional interface screen 601, but in the present example, by clicking and selecting the subordinate node 616 in which only the keymap window 630 is displayed, as shown in FIG. 9B, the subordinate node 616 that is selected by clicking in the keymap window 630 is displayed on the three-dimensional interface screen 601 as a subordinate node of the node 615 and is resultantly displayed as node extension of the node 615.

The virtual reality-based three-dimensional web search interface 600 according to an exemplary embodiment of the present invention with the above method enables a user to access to entire nodes that are not entirely displayed due to a restriction of a screen size.

Next, when the user selects a specific node of the virtual reality-based three-dimensional web search interface 600, the web search system 10 according to an exemplary embodiment of the present invention enables to read information that is included in a web object such as a web document that is linked to a corresponding node through the same screen or a separate pop-up screen. In this case, when the user wants only central information of a selection node, brief mini information of a call out form may be displayed on a corresponding node through an action of putting a mouse on a corresponding node instead of click.

Figure 10:
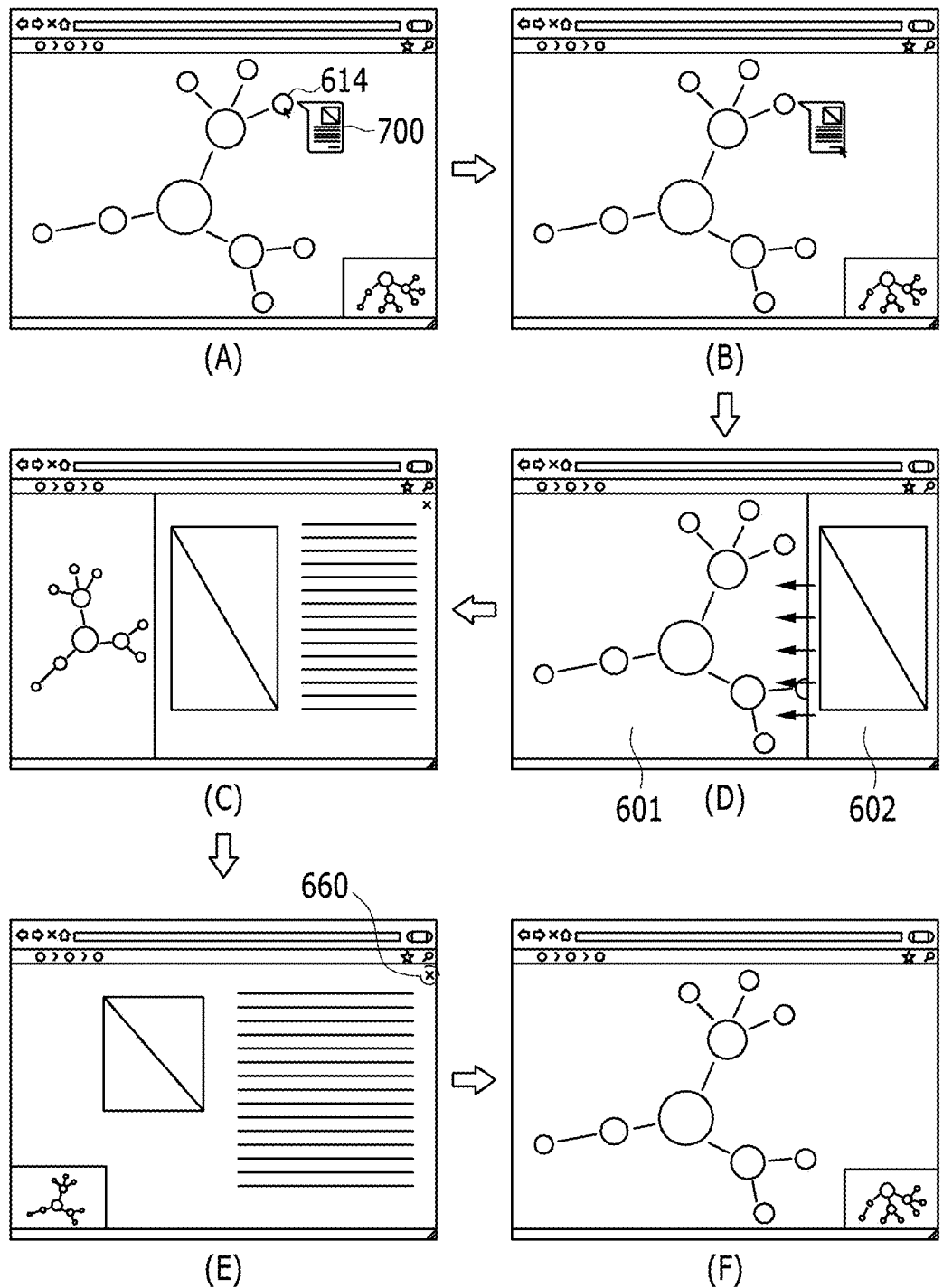
FIG. 10 is a diagram illustrating an example of a web document that is linked to a node in a virtual reality-based three-dimensional web search interface according to an exemplary embodiment of the present invention.

FIG. 10 is a diagram illustrating an example of displaying a web document that is linked to a node in a virtual reality-based three-dimensional web search interface according to an exemplary embodiment of the present invention.

Referring to FIG. 10A, when the user puts a mouse on a specific node 614, the web search system 10 displays call out 700, which is brief information corresponding to the node 614 beside the node 614.

When the user views the call out 700 that is displayed in this way and clicks the call out 700 to read more detailed information, as shown in FIG. 10B, more specifically, when the user clicks "More Information" that is described in the call out 700, the web search system 10 gradually enlarges and displays an information page screen 602 that is linked to the corresponding node 614 while gradually reducing the three-dimensional interface screen 601, as shown in FIGS. 10C and 10D and closes the three-dimensional interface screen 601 and entirely displays the information page screen 602 of the corresponding node 614 on the entire screen 600, as shown in FIG. 10E.

Thereafter, when the user grasps information through the information page screen 602 of the corresponding node 614 and clicks again a screen display area conversion button 660 for search of another node, the web search system 10 removes the information page screen 602 and displays again the three-dimensional interface screen 601 for search of another node, as shown in FIG. 10F.

In this way, by clicking nodes that are displayed on the virtual reality-based three-dimensional web search interface screen 600 with a mouse, the user may read web object information that is linked to a corresponding node through the same screen or another screen.

As described above, the user may read information that is linked to the node 614 through call out that is displayed in the node 614, but by directly clicking the corresponding node 614, the user may read information that is linked to the corresponding node 614. In this case, a mouse clicking action, which is an action in which the user performs to extend to subordinate nodes of the corresponding node 614 or to return to a cluster of previous subordinate nodes from a cluster of subordinate nodes that are extended in contrast is distinguished from a mouse click action in which the user performs to read information that is linked to the corresponding node 614. Therefore, the two actions may be classified and controlled through a one-time click action and a two-time click action of a mouse. For example, a one-time click action of a mouse represents extension or reduction of nodes, and a two-time click action of a mouse represents an action of displaying an information screen that is linked to a clicked node.

Next, the web search system 10 according to an exemplary embodiment of the present invention stores nodes in which a specific user selects and reads information through the virtual reality-based three-dimensional web search interface 600 as web search history data of a corresponding user within the search history DB 300, and by displaying nodes having a high interest level on a user basis through a visual clue such as a color change such as nodes in which the corresponding user has visited based on the data, nodes having the high frequency of visit, or nodes in which the user directly selects as an interest node, the web search system 10 may visualize information search preference of a corresponding user. It is preferable that such visualization is implemented to arouse a user attention through a color change or blinking of a node. In this case, when a specific user connects using interest information on a user basis for visualization, a VRML editor should make and provide a three-dimensional interface of a version for the user. Such a process is already well known and thus a detailed description thereof will be omitted.

Further, when the web search system 10 according to an exemplary embodiment of the present invention displays a bookmark 640 on the three-dimensional interface screen 600 and selects the bookmark 640 through mouse click or menu selection for an information node in which a user particularly has an interest, the web search system 10 displays a bookmark in a corresponding node and enables to effectively reduce a search effort when a corresponding user revisits the same site through a visual clue such as a color change or blinking for the bookmarked node.

Further, when the virtual reality-based three-dimensional web search interface screen 601 and the information page screen 602 that is appeared upon clicking one node are displayed on the same the screen 600, a screen ratio of two visual elements may be dynamically changed according to whether step of selecting a node or after a specific node is selected. That is, at step of selecting a node, a close-up view of the web search interface screen 601 is displayed and the information page screen 602 is reduced and displayed, but after a specific node is selected, the web search screen 601 is reduced, and by displaying a close-up view of the information page screen 602, a user interest screen is extended in real time.

The virtual reality-based three-dimensional web search interface 600 that is provided in the web search system 10 according to an exemplary embodiment of the present invention is visualized with a three-dimensional connection body of nodes and links that are formed in a polyhedron basically including a hexahedron, polyhedron, a spherical shape, 3D mesh or a random irregular form and can search for or select desired nodes while enlarging, reducing, moving, and rotating the three-dimensional interface object according to a user input through a mouse.

The above example describes a tree structure, and when the virtual reality-based three-dimensional web search interface 600 has a network structure, the network structure does not have a separate root node or branch node, unlike a tree structure and has a structure in which a specific node may be connected to any other node and thus a method of generating a cluster of new nodes on a screen and reducing previous nodes is inappropriate for additional search of the subordinate nodes in a terminal node that is displayed on the three-dimensional interface screen 601, as in a three-dimensional object of a tree structure.

Therefore, in this case, by simply reducing a size of a visualized three-dimensional interface object, selectively displaying only nodes that are connected to a specific node with a network method, or by selectively visualizing a network of only nodes that contain desired information by filtering nodes that are connected to links of a network method on the screen 601, as needed based on a previously selected reference, the virtual reality-based three-dimensional web search interface 600 operates with a method of simplifying visual complexity or reducing the number of nodes that may be expressed on a limited screen.

In this case, an icon or a menu bar may be provided to return anytime to a virtual reality-based three-dimensional web search interface object of a network structure. Configuration methods or manipulation methods of other functions are similar to the virtual reality-based three-dimensional web search interface 600 of a tree structure and thus a detailed description thereof will be omitted.

Next, a network internal type tree structure of the virtual reality-based three-dimensional web search interface 600 of a hybrid structure may be applied to similar to a three-dimensional interface object of a tree structure. However, in a tree internal type network structure or a tree and network coupled structure, an interaction method with a user is set similar to a three-dimensional interface object of a network structure.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A web search system that provides a virtual reality-based three-dimensional web search interface, the web search system comprising:
    an input and output interface unit that displays a three-dimensional object comprising a plurality of nodes each to which an information page is linked and a plurality of links that connect the plurality of nodes, respectively, in a three-dimensional form, either static or spinning, and that displays an information page that is linked to the node according to a user input;
    a metadata processor that visually displays the node and the link based on metadata that are linked to visual attributes of the plurality of nodes and the plurality of links,
    wherein the metadata comprises retained data, that is stored in connection with at least one of the plurality of nodes or at least one of the plurality of links; and
    a web server comprising a controller that controls the input and output interface and the metadata processor to provide a virtual reality-based three-dimensional web search interface to a user and that obtains a corresponding information page according to a user selection through the input and output interface to provide the information page through the input and output interface unit,
    wherein the input and output interface unit comprises:
    a Virtual Reality Modeling Language (VRML) or X3D browser that visualizes a file comprising the three-dimensional object that is constructed in a virtual reality form into a screen of an actual three-dimension based on a user manipulation;

a Hypertext Markup Language (HTML) document output device that outputs an information page that is linked to a node in which a user selects on the three-dimensional web search interface on a screen; and a web browser comprising a node filter requirement input device that receives information reading filter conditions in which a user selects to transfer the conditions to the VRML or X3D browser.

2. The web search system of claim 1, further comprising:
a search history database that stores information on a user basis comprising a user search history, a bookmark, or a preference node through the three-dimensional web search interface; and
a retention management unit that generates a three-dimensional object that is displayed in the input and output interface unit and that performs retention management of metadata for a visual attribute processing of nodes and links in the metadata processor.

3. The web search system of claim 2, wherein the retention management unit generates a corresponding VRML file and HTML file through modeling of the three-dimensional object and performs an HTML document edition that is linked to nodes and a VRML object edition for updating a visual attribute processing of nodes and links in the metadata processor in real time or in semi-real time to correspond to information attributes changing in real time on a web.

4. The web search system of claim 3, wherein the web server comprises:
the HTML file and a VRML file existing in an independent form or existing within the HTML file; and
wherein the controller is configured to provide the three-dimensional web search interface through the input and output interface unit using the VRML file and the HTML file and that performs a visual attribute control of nodes and links on the three-dimensional web search interface through the metadata processor and that manages a search history of users.

5. The web search system of claim 3, wherein the retention management unit comprises:
a three-dimensional object modeler that models a three-dimensional object; a VRML file converter that converts the three-dimensional object that is modelled by the three-dimensional object modeler to a VRML file so as to convert to a virtual reality object;
a VRML object editor that maps reaction forms for converting a visual attribute of each node or links based on information that is input from the metadata processing unit and user manipulation actions comprising operation of reduction, enlargement, movement, rotation, expanding, hiding, removal, and addition of VRML objects that are included in a VRML file that is converted by the VRML file converter;
an HTML document editor that writes an HTML document that contains hypertext-based information that is linked to a node, when the node is selected by integrating a VRML file that is edited by the VRML file converter with an HTML file; and
a manager interface that provides an interface that enables to perform a retention management work by accessing to retention management related constituent elements of the web search system.

6. The web search system of claim 5, wherein the retention management unit performs a VRML object edition for making and providing a three-dimensional interface of a personalized version for a user, when a specific user is connected to perform visualization through color changes or blinking of nodes with the nodes which the user has visited or that has the high visit frequency or the nodes having a high interest on each user basis comprising a node in which the user directly selects as an interest node.

7. The web search system of claim 1, further comprising at least one subordinate node associated with a first node of the plurality of nodes, wherein the at least one subordinate node is configured to be hidden until a user selection of one of the first node.

8. The web search system of claim 7, wherein the first node is configured to blink when the at least one subordinate node is hidden.

9. The web search system of claim 1, wherein the input and output interface unit displays a three-dimensional object by performing an action of reduction, enlargement, movement, rotation, expanding, hiding, removal, and addition in the three-dimensional object that is formed with the node and the link that are displayed in the three-dimensional form according to a user input, or displays an information page that is linked to a node that is selected by a user.

10. The web search system of claim 9, wherein the three-dimensional web search interface is displayed through a screen of a display, and the screen comprises a three-dimensional interface screen that displays the three-dimensional object and a keymap window that enables to know a location in which the three-dimensional object that is displayed on the three-dimensional interface screen belongs to an entire construction body while displaying the entire construction body.

11. The web search system of claim 10, the input and output interface unit selects a node that is displayed on the three-dimensional interface screen and enlarges or reduces the three-dimensional interface screen by displaying subordinate nodes of the selected node on the three-dimensional interface screen or by removing subordinate nodes of the selected node on the three-dimensional interface screen.

12. The web search system of claim 11, wherein subordinate nodes are displayed on the three-dimensional interface screen in a pop-up form by setting the specific node to a new root node, if a specific node or subordinate nodes of the specific node are displayed with a distinguished method of click or double click by distinguishing a movement to a web object or a web document that is interlocked with the specific node with a distinguished method of click or double click from a case in which a user selects, when the specific node is selected for extension on the three-dimensional interface screen, and
subordinate nodes that have been branched and extended from a corresponding node are removed and a screen before the specific node is extended is again displayed, when the specific node that is extended and displayed in a pop-up form on the three-dimensional interface screen is selected with a distinguished method of click or double click.

13. The web search system of claim 12, wherein extension of the three-dimensional interface screen comprises displaying nodes that are not displayed by being temporarily hidden or faded on the three-dimensional interface screen or that are displayed on the three-dimensional interface screen and that are displayed on the keymap window among nodes in which recognition is difficult in a viewing angle of a three-dimensional object or in a visual configuration form on the three-dimensional interface screen by selection on the keymap window and performing a web search based on the display.

14. The web search system of claim 12, wherein a ratio between an occupying area of the three-dimensional search interface in which the three-dimensional interface screen is formed with coupling of three-dimensional nodes and links about the specific node that is selected when a node is extended on the three-dimensional interface screen and an area that displays a linked information document when a user selects one of these nodes is dynamically converted and displayed.

15. The web search system of claim 10, wherein a three-dimensional object is displayed on the three-dimensional interface screen, and an entire shape thereof that is formed with coupling of nodes and links constituting the three-dimensional object is visualized through a three-dimensional connection body of one of a polyhedron, a spherical shape, 3D mesh or an irregular form.

16. The web search system of claim 9, wherein the plurality of nodes are displayed by an attribute of at least one of:
- a size attribute that has user designation information that is linked to a node size such as a size corresponding to the accumulation number of users that have visited an information page that is linked to each node or an accumulated sales volume of a product that is linked to a corresponding node;
- a color attribute that has user designation information that is linked to whether maleficence of a website that is linked to each node or a maleficence level, popularity of a corresponding website that is calculated based on the visit frequency of users in which a corresponding website has visited, or a node color such as a color according to a characteristic classification of contents in which a corresponding website contains; and
- a blinking attribute that has user designation information that is linked to blinking of a node such as blinking so as to represent that a website that is linked to each node is updating or that a product that is linked to a corresponding website is on sale.

17. The web search system of claim 16, wherein the plurality of links are displayed by an attribute of at least one of:
- a thickness attribute that displays user designation information that is linked to a thickness of a link such as strength of association between web objects that are represented with two nodes of both ends to which each link is connected;
- a length attribute that displays user designation information that is linked to a link length such as a physical length between two nodes of both ends to which each link is connected;
- a color attribute that represents user designation information that is linked to a color of a link such as a relationship of two nodes of both ends to which each link is connected; and
- a blinking attribute that represents user designation information that is linked to blinking of a link such as whether a change of association of two nodes of both ends to which each link is connected.

18. The web search system of claim 9, wherein the each node displays simplified version information of a call out form that is linked to a corresponding node, when a user clicks or puts a cursor of a mouse on the corresponding node so as to assist a selection by the user, and
wherein the input and output interface unit displays an information page that is linked to the each node by directly selecting each node or by selecting each node through the call out by operations of the user.

19. The web search system of claim 1, wherein the three-dimensional web search interface screen differently applies and displays a screen ratio of the three-dimensional interface screen and a selected information page screen according to whether selection of complexity and the number of nodes that are displayed on the screen, when one node of the three-dimensional object is selected and when an information page screen in which an information page that is linked thereto is displayed is simultaneously formed on the display screen.

* * * * *